United States Patent
Matsuo et al.

[11] Patent Number: 5,910,159
[45] Date of Patent: Jun. 8, 1999

[54] REFRIGERATING CYCLE APPARATUS

[75] Inventors: Hiroki Matsuo, Kariya; Hisashi Tanaka, Anjo; Hikaru Sugi, Nagoya, all of Japan

[73] Assignee: Denso Corporation, Kariya, Japan

[21] Appl. No.: 08/978,460

[22] Filed: Nov. 26, 1997

[30] Foreign Application Priority Data

Nov. 28, 1996 [JP] Japan ................................. 8-318206

[51] Int. Cl.⁶ ................................................. G05D 23/32
[52] U.S. Cl. ................................. 62/158; 62/117; 62/199; 62/226; 62/430
[58] Field of Search ............................. 62/199, 158, 226, 62/430, 524, 117

[56] References Cited

U.S. PATENT DOCUMENTS 4,918,936  4/1990  Sakamoto ........................... 62/430 X
5,333,469  8/1994  Hullar et al. ........................... 62/181
5,465,591  11/1995  Cur et al. ........................... 62/199 X

FOREIGN PATENT DOCUMENTS

A-62-149509  7/1987  Japan.

*Primary Examiner*—Henry Bennett
*Assistant Examiner*—Susanne C. Tinker
*Attorney, Agent, or Firm*—Harness, Dickey & Pierce, PLC

[57] ABSTRACT

A refrigerating cycle apparatus for averting shortages of its refrigerant in a refrigerating cycle and of oil reflux regardless of fluctuations in the progress of freezing in a cold accumulating material. In operation, two solenoid valves are opened and a compressor is activated. The activated compressor causes stagnant refrigerant inside a cold accumulating evaporator to be collected into a receiver. Thereafter, one solenoid valve is closed to let the refrigerant flow only to the cold accumulating evaporator. This makes it possible to circumvent shortages of the refrigerant in the refrigerating cycle and of oil reflux irrespective of varying progress in the freezing status of the cold accumulating material.

16 Claims, 4 Drawing Sheets

REFRIGERATING CYCLE APPARATUS

CROSS-REFERENCE TO RELATED APPLICATION

This application is related to Japanese Patent Application No. Hei 8-318206, incorporated herein by reference.

BACKGROUND OF THE INVENTION

1. Field of the Invention

The present invention relates to a refrigerating cycle apparatus having multiple evaporators connected in parallel and operating under different evaporation pressures, where an evaporator working under the lowest evaporation pressure freezes a cold accumulating material. More particularly, the invention relates to a vehicular air-conditioner in which an evaporator operating under a high evaporation pressure air-conditions the interior of the vehicle while another evaporator working under a low evaporation pressure freezes a cold accumulating material so that when the vehicle is parked and inactive, the latent heat properties of the cold accumulating material are used to air-condition the vehicle interior.

2. Description of Related Art

An onboard vehicle air-conditioner of the above-mentioned type is described in Japanese Laid-Open Patent Publication No. Sho 62-149509. This device has a refrigerating cycle compressor equipped with a primary and a secondary inlet port independent of each other. The two inlet ports correspond to a primary and a secondary group of compressor cylinders. The primary inlet port is connected to the outlet of an evaporator for air-conditioning the driver's compartment of a truck, and the secondary inlet port is linked to the outlet of a cold accumulating evaporator which air-conditions the driver's nap space on the truck.

A constant-pressure expansion valve is installed upstream of the evaporator for the nap space of the truck. In operation, the constant-pressure expansion valve keeps the pressure of the cold accumulating evaporator for the nap space at 1.0 to 1.2 kg/cm$^2$ (the evaporation temperature is between $-10°$ C. and $-8°$ C. for refrigerant R-12 (dichlorodifluoromethane)). The evaporator freezes the cold accumulating material while the vehicle is running, whereby cold potential is accumulated. When the vehicle is parked, air chilled by the cold accumulating material is sent into the nap space. In this manner, the nap space is air-conditioned without having the compressor actuated by the engine of the vehicle.

According to the present inventors' experiments and studies, the proposed apparatus above is subject to irregularities in the behavior of the refrigerant within the refrigerating cycle in connection with the freezing of the cold accumulating material. The irregularities, not mentioned in the above-cited publication, are as follows:

In the above device, the freezing of the cold accumulating material makes the temperature inside the cold accumulating evaporator for the nap space equal to the temperature of a decompressed two-phase (gas/liquid) refrigerant. The liquid refrigerant is unable to absorb heat from the cold accumulating material and is thus forwarded in its liquid form, i.e., without being evaporated, to the outlet side. As a result, when the cold accumulating material is completely frozen (i.e., cold accumulating operation completed), the liquid refrigerant remains stagnant throughout the cold accumulating evaporator.

When the compressor is at rest with the cold accumulating operation completed, the cold accumulating material is at about 0° C. and the refrigerant pressure inside the cold accumulating evaporator for the nap space is approximately 0.2 MPa. Where the outside temperature is illustratively 25° C., the refrigerant pressure outside the cold accumulating evaporator is 0.6 MPa. The resulting difference in pressure between the cold accumulating evaporator for the nap space and the evaporator environment would cause the refrigerant to enter the cold accumulating evaporator and stay there. That eventuality appears to be forestalled by the proposed apparatus having a solenoid valve installed upstream of the cold accumulating evaporator and a check valve located downstream thereof. However, leaks through the valves make it impossible completely to stop the entry of the refrigerant into the cold accumulating evaporator for the nap space.

The resulting shortage of the refrigerant in the evaporator for the driver's compartment can render the evaporator performance insufficient for air-conditioning. At the same time, inside the compressor, both the refrigerant and the lubricating oil that circulates through the refrigerating cycle remain stagnant in the cold accumulating evaporator. A shortage of oil reflux as a result of this can lead to lubrication irregularities.

SUMMARY OF THE INVENTION

In view of the above problems of the prior art, an object of the present invention is to provide a refrigerating cycle apparatus for averting shortages of refrigerant in a refrigerating cycle and of oil reflux regardless of fluctuations in the status of freezing in a cold accumulating material being used.

The above objects are achieved according to an aspect of the present invention by providing a refrigerating cycle apparatus for averting shortages of its refrigerant in a refrigerating cycle and of oil reflux regardless of fluctuations in the progress of freezing in a cold accumulating material. In operation, two solenoid valves are opened and a compressor is activated. The activated compressor causes stagnant refrigerant inside a cold accumulating evaporator to be collected into a receiver. Thereafter, one solenoid valve is closed to let the refrigerant flow only to the cold accumulating evaporator. This makes it possible to circumvent shortages of the refrigerant in the refrigerating cycle and of oil reflux irrespective of varying progress in the freezing status of the cold accumulating material.

Other objects and features of the present invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PRESENTLY PREFERRED EXEMPLARY EMBODIMENTS

Figure 1:
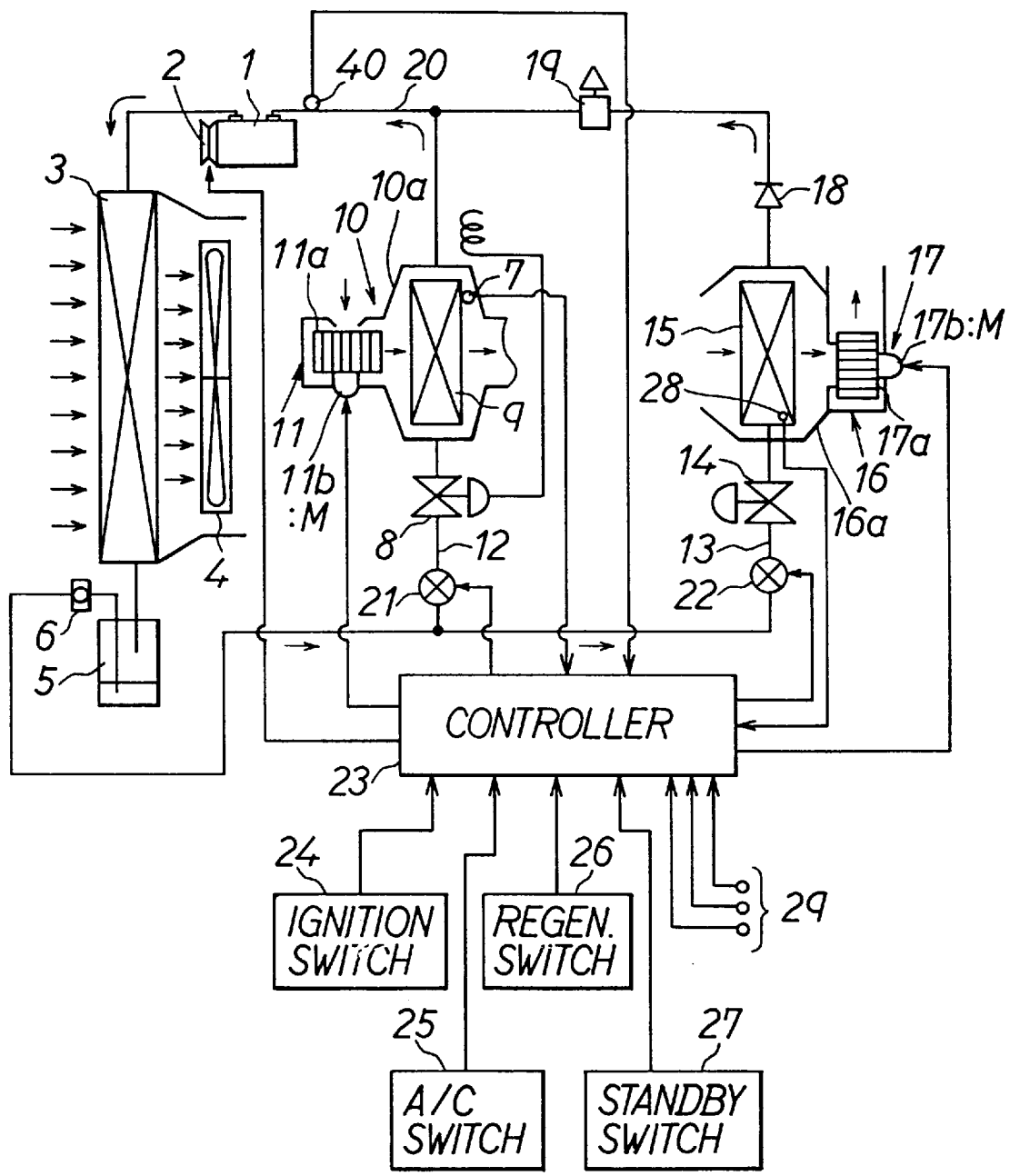
FIG. 1 is a schematic view of a refrigerating cycle system according to a first preferred embodiment of the present invention.

Preferred embodiments of the invention will now be described with reference to the accompanying drawings.
First Embodiment FIG. 1 is a schematic view of a refrigerating cycle apparatus for use on board a vehicle such as a truck, the apparatus providing ordinary air-conditioning of the driver's compartment of the truck as well as accumulated cold-based air-conditioning of the driver's nap space on the truck. In FIG. 1, a compressor 1 is driven by the engine of the truck (not shown) via an electromagnetic clutch 2.

A condenser 3 cools and condenses high-temperature high-pressure gas refrigerant discharged from an outlet port of the compressor 1. The cooling operation of the condenser 3 is effected by blasts of air from a cooling fan 4 driven by an electric motor or the like. A receiver 5 separates a liquid phase of the refrigerant from its gaseous phase to receive the separated liquid refrigerant only. The receiver 5 is of a known type incorporated in the refrigerating cycle on board the vehicle.

A sight glass 6 is located in a refrigerant circuit downstream of the receiver 5. Looking through the sight glass 6, an operator checks gas/liquid status of the refrigerant (specifically, the degree of opaqueness of the refrigerant) downstream of the receiver 5 to judge whether the amount of the refrigerant is appropriate. A thermostatic expansion valve 8 is first decompressing means for expanding the liquid refrigerant through decompression. An air-conditioning evaporator 9 is a first evaporator for air-conditioning the driver's compartment of the truck. The air-conditioning evaporator 9 is located under the instrument panel at the front of the driver's compartment, inside an air-conditioner case 10a of an air-conditioning unit 10. The expansion valve 8 regulates the flow rate of the refrigerant so that the degree of superheating of the refrigerant discharged by the evaporator 9 stays at a predetermined value.

The air-conditioner case 10a is connected to a blower 11 including a centrifugal fan 11a and a driving motor 11b. The air blown by the blower 11 is cooled by the evaporator 9 before being sent into the vehicle interior (i.e., driver's compartment) through a heater unit and a diffuser mechanism (not shown).

An air-conditioning refrigerant circuit 12 (first refrigerant circuit) includes the expansion valve 8 and evaporator 9 for air-conditioning, the driver's compartment. A cold accumulating refrigerant circuit 13 (second refrigerant circuit) is installed in parallel with the air-conditioning refrigerant circuit 12. A constant pressure expansion valve 14 is second decompressing means for expanding through decompression the liquid refrigerant flowing into the cold accumulating refrigerant circuit 13. A cold accumulating evaporator 15 serves as a second evaporator.

A cold accumulating air-conditioning unit 16 is installed within the driver's nap space at the back of the driver s compartment. A cold accumulating air-conditioning unit case 16a houses a cold accumulating evaporator 15 in addition to the cold accumulating air-conditioning unit 16. A blower 17 for nap space air-conditioning, located inside the cold accumulating air-conditioning unit case 16a, is operated from an onboard battery (not shown) when the vehicle is parked. The blower 17 is made up of a centrifugal fan 17a and a driving motor 17b for driving the fan.

The constant pressure expansion valve 14 is decompressing means of a known type. The valve 14 stays closed until the refrigerant pressure on its downstream side reaches a set value (e.g., 1.0 kg/cm$^2$G at evaporation temperature of $-10°$ C.). When the refrigerant pressure drops below the set value, the constant pressure expansion valve 14 is opened.

A check valve 18, located on the refrigerant conduit at the outlet side of the cold accumulating evaporator 15, allows the refrigerant to flow only from upstream to downstream through the evaporator 15; any flow of the refrigerant in the opposite direction is prevented by the valve 18. A refrigerant replenishing valve 19, commonly known as a service valve, is located downstream of the check valve 18. A suction-side conduit 20 combines downstream portions of the air-conditioning refrigerant circuit 12 and of the cold accumulating refrigerant circuit 13, the combined part being connected to an inlet port of the compressor 1.

Solenoid valves 21 and 22 are located in upstream portions of the air-conditioning refrigerant circuit 12 and of the cold accumulating refrigerating circuit 13. The valves 21 and 22 are used to switch the inflow of the refrigerant to the two circuits 12 and 13.

A controller 23 is made up of a microprocessor and its related peripheral circuits. The microprocessor includes a ROM (not shown) that stores a predetermined air-conditioning program and a RAM (not shown) for temporarily accommodating suitably collected ambient factors necessary for air-conditioning control.

The controller 23 has input terminals connected to the following parts: an evaporator temperature sensor 7 for detecting an ambient air temperature downstream of the air-conditioning evaporator; an ignition switch 24 by which the vehicle engine is turned on and off; an air-conditioning switch 25 positioned on an air-conditioner control panel (not shown); a cold accumulating switch 26 positioned on the air-conditioner control panel; a nap space air-conditioning switch 27 positioned on a control panel of the unit case 16a for the cold accumulating air-conditioning unit 16; a temperature sensor 28 for detecting the surface temperature of the cold accumulating material cooled by the cold accumulating evaporator 15, whereby completion of the cold accumulating operation in the cold accumulating material is detected; a pressure sensor 40 for detecting the suction pressure P of the compressor 1; and a group of air-conditioning control sensors 29 including an outside air temperature sensor and an internal air temperature sensor for collecting the above-mentioned ambient factors.

On receiving input signals from the switches 24 through 27 as well as from the sensors 28, 29 and 40, among others, the controller 23 runs the above-mentioned air-conditioning program to control the electrical parts (2, 11, 17, 21, 22, etc.).

Figure 2:
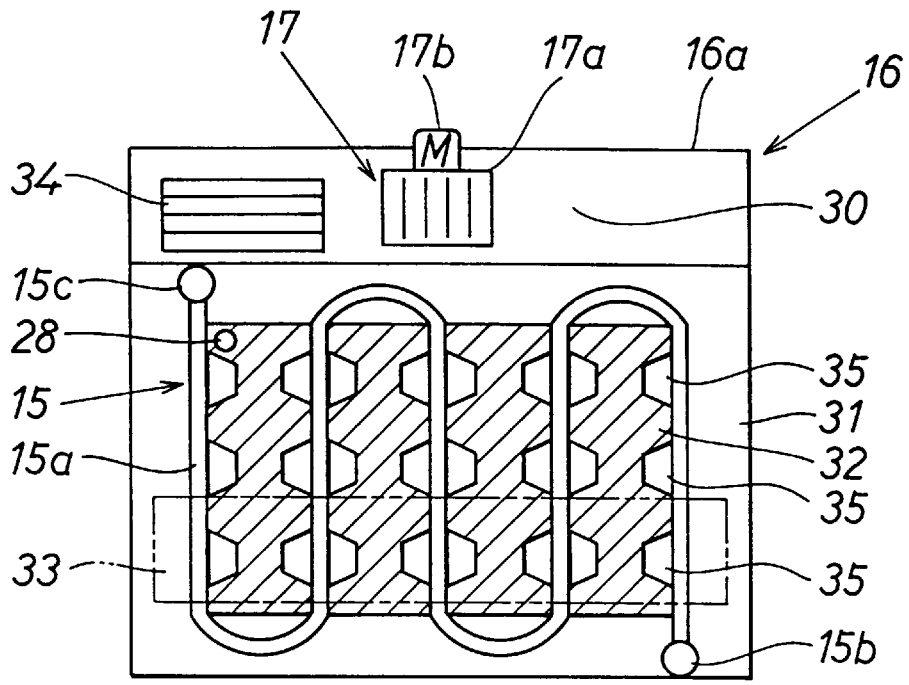
FIG. 2 is a schematic view of a cold accumulating air-conditioning unit shown in FIG. 1.
Figure 3:
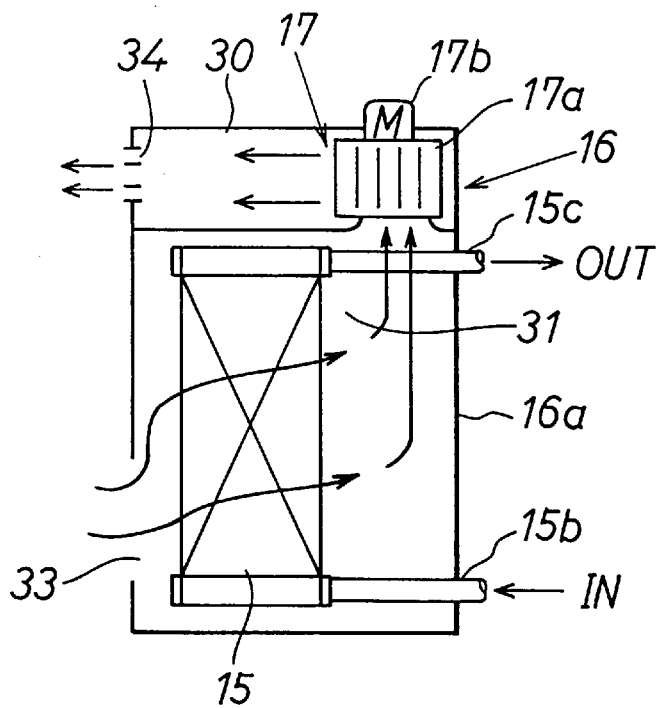
FIG. 3 is a schematic lateral cross-sectional view of the cold accumulating air-conditioning unit in FIG. 2.

FIGS. 2 and 3 show illustratively detailed structures of the cold accumulating air-conditioning unit 16. As depicted, the unit case 16a that houses the cold accumulating air-conditioning unit 16 is a square box. A top portion inside the case 16a includes an air conduit 30. Inside the air conduit 30 is the fan 17a constituting part of the blower 17. Under the air conduit 30 is a chamber 31 furnished to accommodate the cold accumulating evaporator 15.

In the first embodiment, the cold accumulating evaporator 15 is constituted by a multihole flat tube 15a made of aluminum. The flat-shaped perforated tube 15a, whose width of a predetermined size is formed perpendicularly to the view of FIG. 2 as seen, has a large number of parallelly arranged holes that serve as refrigerant paths in a well-known fashion. The flat tube 15a is provided to meander up and down as illustrated in FIG. 2.

The flat tube 15a is flanked snugly on both sides by cold accumulating material packs 32. As indicated, the cold accumulating material packs 32 are each perpendicularly elongated. A thin-walled sack-shaped member is composed of plastic resin, and each pack 32 contains a liquid or soft gel-type cold accumulating material. The packs 32 are preferably made of nylon, polyethylene or a similar substance conducive to being formed into a thin-walled bag for improved performance of heat exchange with blown air.

A refrigerant inlet pipe 15b located under the cold accumulating evaporator 15 introduces the refrigerant into the flat tube 15a. A refrigerant outlet pipe 15c positioned above the flat tube 15a allows the refrigerant to flow out of the flat tube 15a. Near the lower edge on the front wall of the cold accumulating air-conditioning unit case 16a is an air inlet port 33 furnished to suck air from the driver's nap space on the truck. Around the upper edge on the front wall of the unit case 16a is a cold air outlet grill 34 provided to blow air cooled by the cold accumulating material packs 32 into the nap space on the truck.

As shown in FIG. 2, the cold accumulating material packs 32 have concave and convex portions which form a large number of air conduits 35 with respect to the flat surfaces of the tube 15a. With the blower 17 in operation, the air inside the nap space on the truck is sucked into the case 16a through the air inlet port 33. The sucked air, while passing through the numerous air conduits 35, is cooled efficiently by the cold accumulating material packs 32.

The first embodiment of the above constitution works as follows: turning on the air-conditioning switch 25 alone causes the controller 23 to energize the electromagnetic clutch 2 provided the temperature detected by the evaporator temperature sensor 7 is at least 4° C. The compressor 1 is then connected via the electromagnetic clutch 2 to the vehicle engine and is driven by the latter. The solenoid valve 21 is opened when the air-conditioning switch 25 is turned on, whereas the solenoid valve 22 stays closed because the cold accumulating switch 26 has yet to be operated.

The compressor 1 in operation causes the refrigerant to circulate through the air-conditioning refrigerant circuit 12 inside the refrigerating cycle apparatus of FIG. 1. The refrigerant in its entirety flows from the compressor 1 to the air-conditioning evaporator 9. The air blown by the blower 11 is cooled by the air-conditioning evaporator 9, whereby the driver's compartment of the truck is air-conditioned.

If the temperature detected by the evaporator temperature sensor 7 is 3° C. or lower, the controller 23 turns on the blower 11 while keeping the compressor 1 inactive. This also allows the driver's compartment of the truck to be air-conditioned. If the temperature detected by the evaporator temperature sensor 7 is raised during operation to reach or exceed 4° C., the controller 23 activates the compressor 1 (only air-conditioning is effected).

That is, the controller 23 deactivates the compressor 1 automatically when the detected temperature at the evaporator sensor 7 comes down to 3° C. or lower. This is to make sure that the air-conditioning evaporator 9 will not be frosted. As blasts of air raise the temperature detected by the evaporator temperature sensor 7, the cooling capacity of the air-conditioning evaporator 9 declines correspondingly. When the detected temperature at the sensor 7 reaches 4° C., the controller 23 again activates the compressor 1 automatically.

If the driver or someone on the truck foresees the need to air-condition the nap space when the truck is eventually parked, the cold accumulating switch 26 is to be turned on while the truck is still running. If the air-conditioning switch 25 has already been activated by that time, the controller 23 carries out two operations concurrently: air-conditioning the driver's compartment, and getting the cold accumulating air-conditioning unit 16 to accumulate cold potential (air-conditioning and cold accumulating operations performed simultaneously). The first embodiment does not permit cold accumulation to be effected alone; the air-conditioning switch 25 must remain on for the cold accumulating operation to take place.

In the simultaneous air-conditioning cold accumulation mode of the first embodiment, the controller 23 operates the solenoid valves 21 and 22 alternately at predetermined intervals: the solenoid valve 21 is opened for 60 seconds while the solenoid valve 22 is closed for 60 seconds, then the valve 22 is opened for 15 seconds while the valve 21 is closed for 15 seconds, and so on. In this manner, the cooling action of the air-conditioning evaporator 9 is interrupted over relatively short periods of time to minimize any adverse effects on the air-conditioning performance of the evaporator 9.

In each fifteen second time period in which the solenoid valve 22 is opened and the valve 21 closed, the opened valve 22 rapidly decreases the inlet pressure of the compressor 1 to open the constant pressure expansion valve 14, thereby allowing the refrigerant to flow through the cold accumulating refrigerant circuit 13. The refrigerant evaporates at a low temperature (e.g., −10° C.) commensurate with the valve opening pressure of the constant pressure expansion valve 14, thus causing the cold accumulating evaporator 15 to start cooling the cold accumulating material packs 32. This freezes the cold accumulating material (water or the like) inside the packs 32 for cold accumulation. In the description that follows, air-conditioning alone or both air-conditioning and cold accumulation performed simultaneously will be referred to as ordinary control (operation).

In the early stage of cold accumulation, the cold accumulating evaporator 15 is subject to a large heat load. This means that the liquid refrigerant entering the flat tube 15a from the refrigerant inlet pipe 15b evaporates completely while still at the refrigerant inlet side of the flat tube 15a. The plurality of cold accumulating material packs 32 in contact with the flat surfaces of the flat tube 15a are cooled and frozen progressively starting from the refrigerant a inlet side of the flat tube 15a.

When the cold accumulating material is completely frozen inside the cold accumulating material packs 32 near the refrigerant outlet side of the flat tube 15a, the surface temperature of these packs 32 drops to a predetermined temperature (e.g., −5° C.). The lowered temperature is detected by the temperature sensor 28 and a signal indicative of the drop is provided to the controller 23. Given the input signal, the controller 23 halts the alternate actuation of the solenoid valves 21 and 22, and keeps the valve 22 closed to cut off the flow of the refrigerant to the cold accumulating evaporator 15.

If the driver or someone on board the truck wants to take a nap in the nap space while the truck is parked (with the compressor 1 at rest), the nap space air-conditioning switch 27 is operated on the front panel of the case 16a housing the cold accumulating air-conditioning unit 16. Turning on the switch 27 causes the blower 17 to operate from the on-board battery. The blower 17 forwards air through the arrowed routes in FIG. 3. As the blown air passes through the conduits 35 between the cold accumulating material packs 32 and the flat tube 15a of the cold accumulating evaporator 15, the air exchanges heat with the packs and is cooled. The cooled air is blown through the cold air outlet grill 34 into the nap space for air-conditioning.

The refrigerant behaves in the refrigerating cycle including the cold accumulating evaporator 15 as follows:

(1) In the solo air-conditioning mode

In the solo air-conditioning mode, the solenoid valve 21 is opened and the valve 22 closed. The suction effected by the compressor 1 removes virtually all refrigerant from inside the cold accumulating evaporator 15.

(2) At the start of cold accumulation

At the start of cold accumulation, the state (1) above is in effect because the solenoid valve 22 has been closed.

(3) During cold accumulation

As mentioned above, the cold accumulating material packs 32 are frozen progressively starting from those near the refrigerant inlet side of the cold accumulating evaporator 15. The frozen packs 32 have a surface temperature substantially equal to the liquid refrigerant temperature (between $-5°$ C. and $-10°$ C.) inside the evaporator 15, with no heat exchanged between the packs 32 and the liquid refrigerant. The liquid refrigerant thus moves past the frozen packs 32 without evaporating and, having reached cold accumulating material packs 32 yet to be frozen, absorbs heat therefrom to evaporate. The actions are repeated in the evaporator 15, whereby the packs 32 are frozen progressively from the refrigerant inlet side to the refrigerant outlet side. Concurrently, the region of the refrigerant in its liquid form shifts progressively from the inlet side to the outlet side inside the evaporator 15.

(4) Upon completion of cold accumulation

With the refrigerant behaving as described, all cold accumulating material packs 32 are eventually frozen. In that state, the liquid refrigerant remains stagnant throughout the cold accumulating evaporator 15. The inactive state of the refrigerant is detected by the temperature sensor 28 as described earlier, and the cold accumulating operation is stopped.

As can be understood from the foregoing description, the amount of the liquid refrigerant remaining stagnant inside the cold accumulating evaporator 15 increases as cold accumulation progresses. When cold accumulation is complete, the amount of the stagnant liquid refrigerant is maximized.

According to experiments conducted by the inventors, the amount of the liquid refrigerant remaining stagnant inside the cold accumulating evaporator 15 turned out specifically as follows: in the experiments, water was used as the cold accumulating material contained in the packs 32. It was found that blowing cold air at around 27° C. for about four hours into the nap space on a parked truck required generating approximately eight kilograms of ice. It was also found that a cold accumulating evaporator 15 capable of producing eight kilograms of ice generated a maximum of 300 g to 400 g of stagnant liquid refrigerant upon completion of the cold accumulating operation.

A continued state of the completed cold accumulation typically reduced the temperature of the cold accumulating evaporator 15 to the lowest level at a minimum pressure inside the refrigerating cycle apparatus. This caused the solenoid valve 22 and constant pressure expansion valve 14 to develop refrigerant leaks, filling the cold accumulating evaporator 15 with liquid refrigerant. As a result, all refrigerant inside the refrigerating cycle apparatus could move into and remain stagnant in the cold accumulating evaporator 15.

With the stagnant refrigerant staying in the cold accumulating evaporator 15, a visual check on the opaqueness of the liquid refrigerant through the sight glass 6 can lead to an erroneous conclusion that the refrigerant is insufficient in quantity. The operator may proceed to add refrigerant through the refrigerant replenishing valve 19 despite the fact the amount of the refrigerant is already appropriate.

With the refrigerant remaining stagnant in the cold accumulating evaporator 15, the amount of the refrigerant flowing through the air-conditioning evaporator 15 is less than if the refrigerant is not stagnant therein. The reduced amount of the refrigerant will lessen the cooling capacity of the air-conditioning evaporator 15 thereby denying full-fledged air-conditioning of the driver's compartment of the truck. In that case, an insufficient amount of the refrigerant sucked into (and discharged from) the compressor 1 worsens the reflux of lubricating oil to the compressor which in turn can develop malfunction.

Furthermore, with an inadequate amount of the refrigerant flowing through the air-conditioning evaporator 9, any refrigerant coming into the evaporator 9 immediately evaporates with a sufficiently high degree of superheating. This boosts the temperature of the refrigerant coming out of the air-conditioning evaporator 15. The higher the temperature of the refrigerant sucked into the compressor 1, the higher the temperature of the refrigerant discharged therefrom. The raised refrigerant temperature promotes the deterioration of rubber members inside the discharge portion of the compressor 1, which adversely affects the durability of the compressor 1 itself.

As described above, when the amount of the refrigerant flowing through the air-conditioning evaporator 9 varies depending on the progress status of cold accumulation in the cold accumulating evaporator 15, it is difficult appropriately to manage the amount of the refrigerant within the refrigerating cycle apparatus. This bottleneck is bypassed by the first embodiment adopting the following method (i.e., air-conditioning program) for controlling the amount of the refrigerant in the refrigerating cycle apparatus.

Briefly, the stagnant refrigerant inside the cold accumulating evaporator 15 is sucked forcibly by the compressor 1. Instead of being fed to the cold accumulating evaporator 15, the sucked refrigerant is circulated through the compressor 1, condenser 3, receiver 5, sight glass 6 and air-conditioning evaporator 9, in that order. With the refrigerant thus circulated, a visual check through the sight glass 6 on the opaqueness of the refrigerant in its liquid form helps control the amount of the refrigerant inside the refrigerating cycle apparatus.

The manner in which the amount of the refrigerant within the refrigerating apparatus is controlled will now be described in detail with reference to the flowchart of FIG. 4. At the outset, a timer for use with various data is reset for initialization and a flag is set to 0. Turning on the ignition switch 24 powers the controller 23, thus allowing the air-conditioning program to be executed.

In step S200, the controller 23 reads various data through its input terminals as well as the on/off status of the air-conditioning switch 25 and of the cold accumulating switch 26, and stores the readings.

In step S300, a check is made to see if the flag is set to 0. What specifically takes place in step S300 will be described later in more detail.

If the flag is set to 0, step S400 is reached. In step S400, a check is made to see if the air-conditioning switch 25 is turned on. If the air-conditioning switch is turned off, a standby state is entered (i.e., a state in which the engine is activated by operation of the ignition switch 24 but the air-conditioner remains inactive).

If the air-conditioning switch 25 is turned on, step S500 is reached. In step S500, a check is made to see if a temperature Te detected by the evaporator temperature sensor 7 is lower than a predetermined temperature Tout (3° C. for the first embodiment). If the detected temperature Te is found to be lower than the predetermined temperature Tout ("YES" in step S500), step S600 is reached. If the result of the check in step S500 is negative ("NO"), then control is returned.

That is, even if the operator turns on the air-conditioning switch 25, the compressor 1 will not be activated as long as the temperature detected by the sensor 7 is 3° C. or lower. This is because getting a low-temperature refrigerant to flow through the air-conditioning evaporator 9 would produce frost degrading the full cooling capacity. If the detected temperature of the sensor 7 is 4° C. or higher, the compressor 1 is activated to supply the air-conditioning evaporator 9 with the refrigerant, whereby the driver's compartment of the truck is air-conditioned.

Figure 4:
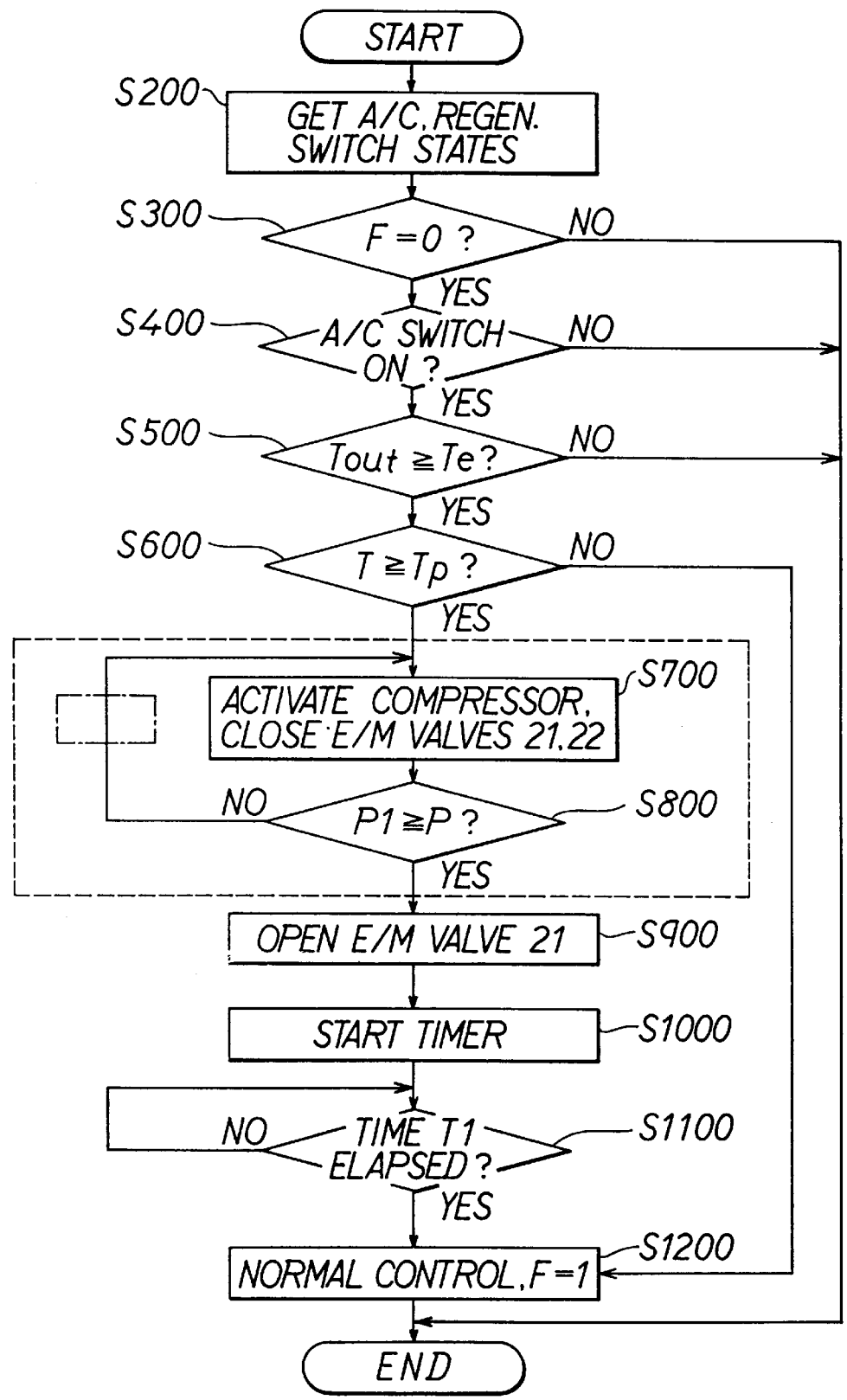
FIG. 4 is a flowchart of a method for inspecting the amount of refrigerant in the refrigerating cycle apparatus according to the first embodiment.

Steps S600 through S1100 in FIG. 4 constitute an inspection program for the refrigerating cycle apparatus (i.e., refrigerant suction control), a crucial feature of this invention. These steps will be described below in detail.

Execution of refrigerant suction control is followed by step S1200. In step S1200, either solo air-conditioning or simultaneous air-conditioning/cold accumulation is effected as ordinary control depending on the status of the switches 25 and 26 retained in step S200. Also in step S1200, the flag is set to 1.

The following is a detailed description of refrigerant suction control:

In step S600, a check is made to see if a temperature Tp detected by the temperature sensor 28 about the cold accumulating material is lower than a predetermined temperature T (set to 0° C. for cold accumulating material cold accumulating material is judged to be frozen if the detected temperature Tp is lower than 0° C., which reveals that the cold accumulating evaporator 15 contains a large amount of refrigerant composed of stagnant liquid.

If the cold accumulating evaporator 15 is thus found to contain a significant amount of stagnant refrigerant, step S700 is reached. In step S700, the controller 23 outputs a signal for activating the compressor 1 to the electromagnetic clutch 2, and closes the two solenoid valves 21 and 22 at the same time. This causes the compressor 1 to forcibly suck the refrigerant from inside the cold accumulating evaporator 15 and air-conditioning evaporator 9. The sucked refrigerant is collected in the receiver 5.

If it is found in step S600 that the amount of stagnant refrigerant inside the cold accumulating evaporator 15 is not significant, step S1200 is reached in which the ordinary control mentioned earlier is effected.

In step S800, a check is made to see if a pressure P detected by the pressure sensor 40 located on the inlet side of the compressor 1 is smaller than a predetermined pressure P1. If the result of the check is affirmative ("YES" in step S800), step S900 is reached. If the detected pressure P is not smaller than the predetermined pressure P1 ("NO" in step S800), step S700 is reached again. Then the solenoid valves 21 and 22 are kept closed and the compressor 1 is operated until the detected pressure P of the pressure sensor 40 reaches the predetermined pressure P1.

The rationale behind the above refrigerant suction control is as follows: when the solenoid valves 21 and 22 are closed and the compressor 1 is operated to collect the refrigerant from inside the cold accumulating evaporator 15 into the receiver 5, the compressor 1 cannot remain active indefinitely. With the compressor 1 continuously run while the valves 21 and 22 are closed, the suction pressure of the compressor 1 drops over time. Before long, the compressor 1 may produce abnormal noises or develop poor reflux of lubricating oil and can eventually enter a locked state. Such eventualities are detrimental to the durability of the compressor 1.

Thus when the suction pressure of the compressor 1 drop not more than the predetermined value P1, the solenoid valve 21 needs to be opened as will be described later. With the solenoid valves 21 and 22 closed and with the compressor 1 in operation, the pressure P detected by the pressure sensor 40 on the inlet side of the compressor 1 declines gradually. Specifically, as the stagnant refrigerant is sucked out of the cold accumulating evaporator 15, the detected pressure P of the pressure sensor 40 drops in proportion to the declining amount of the stagnant refrigerant.

That is, the value detected by the pressure sensor 40 reflects the amount of the refrigerant inside the cold accumulating evaporator 15. The detected pressure value makes it possible to ascertain whether all refrigerant is returned to the receiver 5 from inside the cold accumulating evaporator 15.

A similar feature could be implemented by installing a pressure sensor on the outlet side of the compressor 1, but with a significant disadvantage: when the compressor 1 is activated with the solenoid valves 21 and 22 closed, the pressure detected by the outlet-side pressure sensor rises temporarily before precipitating. Such irregular behavior of the detected temperature makes it difficult to predict the amount of the refrigerant inside the cold accumulating evaporator 15. By contrast, installing the pressure sensor 40 upstream of the compressor 1 as described steers clear of the above difficulty and allows the refrigerant quantity to be predicted and the compressor 1 to be protected appropriately.

With the first embodiment, the pressure P1 is set between 0 MPa and 0.05 MPa. The setpoints allow the refrigerant to be completely sucked from inside the cold accumulating evaporator 15 without harming the durability of the compressor 1.

The solenoid valves 21 and 22 are kept closed and the compressor 1 is run continuously as long as the result of the check in step S800 is negative ("No").

Step S900 is reached on the assumption that all refrigerant is sucked out of the cold accumulating evaporator 15 in step S700. In step S900, the solenoid valve 21 is opened while the valve 22 is closed. This causes the refrigerant in the refrigerating cycle apparatus to circulate through the compressor 1, condenser 3, receiver 5 and air-conditioning evaporator 9, in that order, in the left-hand side section of FIG. 1. The feature above forestalls declines in the cooling capability due to refrigerant shortages. The feature also prevents lubrication deficiencies resulting from poor reflux of lubricating oil to the compressor. The check valve 18 installed downstream of the cold accumulating evaporator 15 staves off any reverse flow of the refrigerant after it has passed through the air-conditioning evaporator 9.

Step S900 is followed by step S1000. In step S1000, the timer is started. In step S1100, a check is made to see if the elapsed time on the timer has exceeded a predetermined time T1. During the time T1, the refrigerant is circulated through the compressor 1, condenser 3, receiver 5 and air-conditioning evaporator 9 as described above.

During cold accumulation, the amount of the stagnant refrigerant inside the cold accumulating evaporator 15 varies with the progress status of cold accumulation and cannot be determined precisely. Because the state of the completed cold accumulation is difficult to maintain, the amount of the stagnant refrigerant cannot be verified exactly in that state. It is to overcome such uncertainties that the time T1 is established beforehand. The predetermined time T1, set for about 120 seconds with the first embodiment, is illustratively the time it takes the operator to check the amount of the refrigerant through the sight glass 6. As mentioned above, with little refrigerant remaining stagnant inside the cold accumulating evaporator 15 during the time T1, it is possible to verify exactly whether the refrigerant is sufficient in quantity.

More specifically, if the quantity of the refrigerant within the cycle is normal, the receiver 5 is filled with excess refrigerant. A visual check through the sight glass 6 reveals the replenished state of the refrigerant. This confirms the normal amount of the refrigerant. If refrigerant leaks from the cycle have caused a shortage of the refrigerant within the cycle, the amount of the refrigerant in the receiver 5 decreases. This lets gas-form refrigerant be mixed into the liquid refrigerant flowing through the sight glass 6. An opaque state of the refrigerant is then visible through the sight glass 6 revealing a shortage of the refrigerant.

The refrigerating cycle apparatus is replenished when necessary with refrigerant as follows: with the refrigerating cycle in operation, a container filled with refrigerant is set on the refrigerant replenishing valve 19. The valve 19 is then operated to supply additional refrigerant into the cycle. During the replenishing operation, the operator visually checks the status of the refrigerant inside. The refrigerant is to be added into the cycle until the opaque state of the refrigerant (i.e., a sign of mixture with bubbles) disappears.

When it is found in step S1100 that the time Ti has elapsed, step S1200 is reached. In step S1200, the flag is set to 1 and ordinary control is effected depending on the on/off readings of the air-conditioning switch 25 and of the cold accumulating switch 26 acquired in step S200.

The reason why the flag is set to 1 in step S1200 is as follows: when the ignition switch 24 and the air-conditioning switch 25 are both on, the compressor 1 is operated and the solenoid valves 21 and 22 are closed. This state continues for a predetermined period of time. Thereafter the solenoid valve 21 is open so that the refrigerant is fed to the air-conditioning evaporator 9 alone over a predetermined period of time.

Where the ignition switch 24 is turned on and the temperature Tp detected by the temperature sensor 28 is 0° C. or lower, the compressor 1 is activated with the two solenoid valves 21 and 22 closed. As described, the compressor 1 is activated intermittently under ordinary control depending on the temperature detected by the sensor 7. If the solenoid valves 21 and 22 stay closed and if the refrigerant is sucked from the cold accumulating evaporator 15 under such ordinary control, then the air-conditioning and cold accumulating evaporators 9 and 15 will not function adequately. This can result illustratively in an inability to air-condition the truck interior.

Thus once ordinary control is in effect, the flag is set to 1 in step S1200 so that the refrigerant suction control described above will not be executed (i.e., so as not to suck the refrigerant from inside the cold accumulating evaporator 15). Control is thereafter returned to step S200 which in turn is followed by step S300. In step S300, a check is again made to see if the flag is 0. Subsequent steps are then executed up to step S1200.

As described, the first embodiment controls effectively the amount of the refrigerant in the refrigerating cycle apparatus. With the first embodiment, the inspection program is executed when the compressor 1 is first activated after the ignition switch 24 has been turned on. Execution of the inspection program is followed by ordinary control.

Another method for sucking the refrigerant from inside the cold accumulating evaporator 15 in controlling the refrigerant in the refrigerating cycle apparatus would conceivably involve having an operator connect an inspection device externally to the controller 23, close the solenoid valves 21 and 22, and thereafter open the solenoid valve 21 alone. However, such tasks are bothersome and the inspection device needs to be prepared every time the refrigerating cycle apparatus is desired to be checked. By contrast, the first embodiment allows the inspection program to be executed simply by operation of the air-conditioning switch 25. That is, the operator may easily inspect the amount of the refrigerant whenever such inspection is desired.

A specialized inspection switch would conceivably be added specifically to execute the inspection program, but with an inevitable increase in cost. To inspect the amount of the refrigerant inside the refrigerant cycle apparatus involves the use of such inspecting means as the sight glass and pressure sensors. Using such means for the inspection presupposes activation of the compressor 1.

The air-conditioning switch 25 and cold accumulating switch 26 are provided to operate the two evaporators. In a refrigerating cycle apparatus having a dual evaporator setup, such switches are required to supply refrigerant separately to each evaporator. In the first embodiment, the air-conditioning switch 25, which in any case is necessary, is used instead of a specialized switch to inspect the amount of the refrigerant at low cost.

After the above-described inspection of the refrigerant quantity inside the refrigerating cycle apparatus, the refrigerant is allowed to flow through the air-conditioning evaporator 9 or cold accumulating evaporator 15 depending on the on/off status of the air-conditioning and cold accumulating switches 25 and 26. The arrangement makes it possible to cool the cold accumulating material or to air-condition the truck interior in accordance with the settings established by the driver on board the truck (operator).

Second Embodiment

The second embodiment differs from the first embodiment only in steps S700 and S800 enclosed by the broken line in FIG. 4. A flowchart corresponding to these steps and characterizing the second embodiment is shown in FIG. 5.

With the first embodiment, as shown in step S700, the refrigerant is sucked out of the cold accumulating evaporator 15 until the inlet pressure of the compressor 1 detected by a pressure sensor has dropped to the predetermined pressure P1. Alternatively, the pressure sensor may be dispensed with and replaced by a timer for setting a time period during which the refrigerant is sucked from inside the cold accumulating evaporator 15, as shown in FIG. 5.

Figure 5:
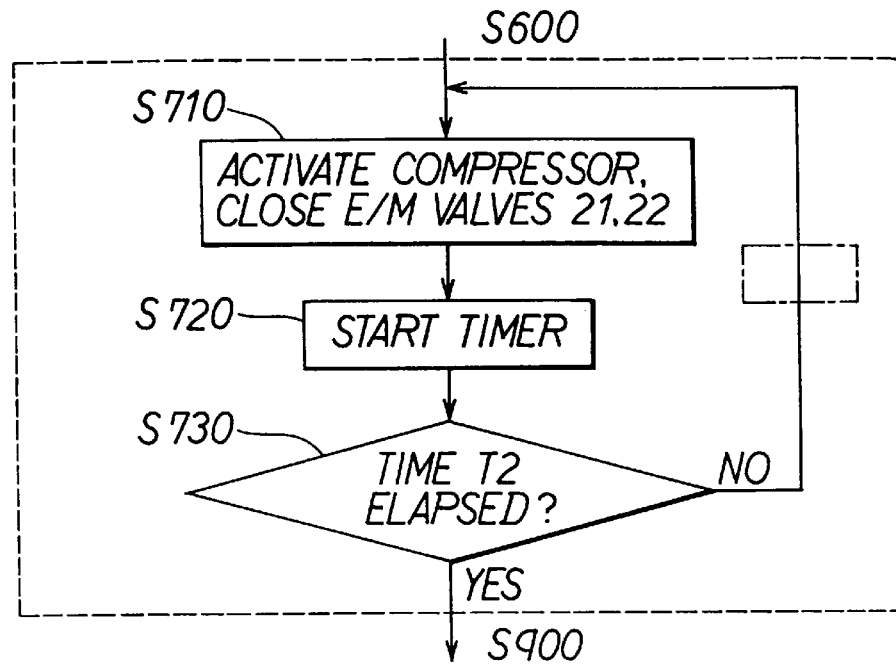
FIG. 5 is a flowchart of a method for inspecting the amount of refrigerant in a refrigerating cycle apparatus according to a second preferred embodiment of the present invention.

Specifically, in step S710 of FIG. 5, the solenoid valves 21 and 22 are closed and the compressor 1 is operated. In step S720, the timer is started. In step 730, a check is made to see if the elapsed time on the timer has reached a predetermined time T2. If the time T2 is found to have elapsed, step S900 is reached in which the solenoid valve 21 is opened.

With the second embodiment, the time T2 is set to between 30 and 60 seconds. The settings allow the refrigerant to be sucked unfailingly out of the cold accumulating evaporator 15 without adversely affecting the durability of the compressor 1.

Third Embodiment

Figure 6:
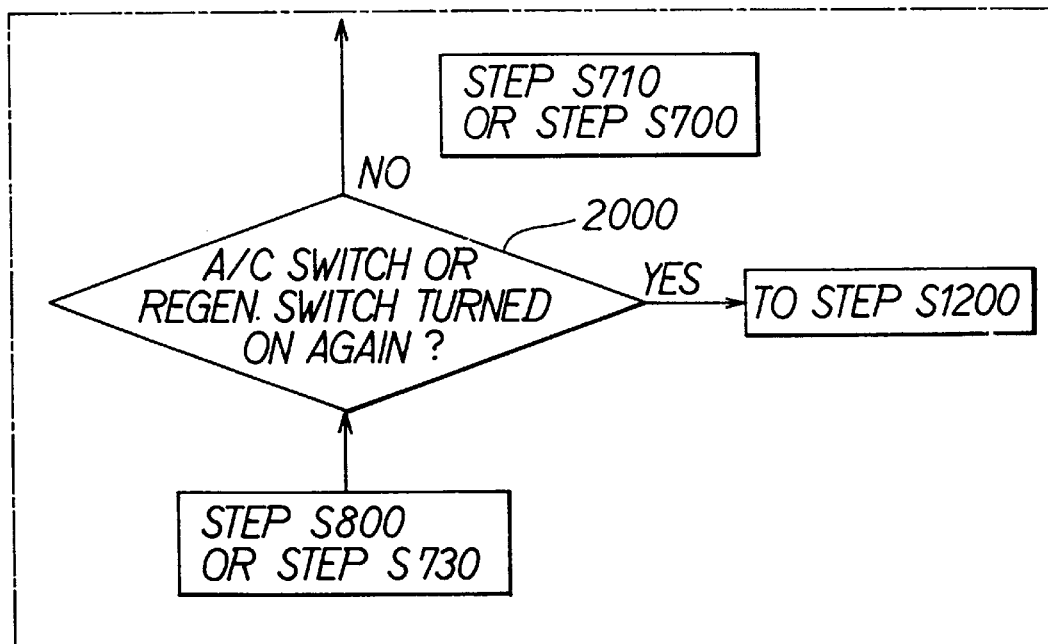
FIG. 6 is a flowchart of a method for inspecting the amount of refrigerant in a refrigerating cycle apparatus according to a third preferred embodiment of the present invention.

The third embodiment of the invention is characterized by addition of a judging condition in the portion enclosed by the dot-dashed line in FIGS. 4 and 5. A flowchart representing the judging condition is shown in FIG. 6.

It was described with reference to FIG. 4 that the solenoid valves 21 and 22 are closed and the compressor 1 is operated until the pressure detected by the pressure sensor 40 has reached the predetermined pressure P1. With the third embodiment, as shown in step S2000 of FIG. 6, a check is made during such operation of the compressor 1 to see if the air-conditioning switch 25 or cold accumulating switch 26 is again turned on (i.e., turned off and then turned on again). If the switch 25 or 26 is found to be turned on again, the inspection program is terminated and followed by ordinary control.

Specifically, if the air-conditioning switch 25 or cold accumulating switch 26 is turned on again, the sucking of the refrigerant from inside the cold accumulating evaporator 15 is halted. Normal control is then resumed depending on the on/off status of the switches 25 and 26. In this manner, refrigerant suction control and ordinary control may be alternated as desired by the operator. Alternatives Although the description above contains many specifics, these should not be construed as limiting the scope of the invention but as merely providing illustrations of the presently preferred embodiments of this invention. For example, the control panel at the front of the case 16a may be equipped with an indicator (e.g., lamp) indicating the completely frozen state of the cold accumulating material based on the temperature detected by the temperature sensor 28. The inspection program may be executed when the completely frozen state of the cold accumulating material is thus indicated.

With each of the preceding embodiments, the inspection program is executed when the temperature detected by the temperature sensor 28 is 0° C. or lower. Alternatively, the inspection program may be run regardless of the temperature detected by the temperature sensor 28.

The preceding embodiments allow the operator visually to inspect the amount of the refrigerant through the sight glass 6. Alternatively, the refrigerant quantity may be verified through the use of a known superheat switch or of a pressure sensor installed on the outlet side of the compressor 1.

With the preceding embodiments, the constant pressure expansion valve 14 is used as the second decompressing means. Alternatively, a thermal expansion valve may be employed to replace the constant pressure expansion valve. In another alternative, the operator may attach an inspection device externally to the controller 23 as described above. The attached inspection device may be operated to close the solenoid valves 21 and 22 and activate the compressor 1, and subsequently to open the solenoid valve 21.

With the third embodiment described above, if the air-conditioning switch 25 or cold accumulating switch 26 is turned on again during suction of the refrigerant from within the cold accumulating evaporator 15, the suction operation is halted. By the same token, refrigerant suction control may be stopped if the air-conditioning switch 25 or cold accumulating switch 26 is turned on again during the inspection time Ti, as described in connection with step S1100 of FIG. 4.

The preceding embodiments do not permit cold accumulation alone to be carried out. Alternatively, arrangements may be made so that the cold accumulating operation alone may be performed by operation of the cold accumulating switch 26 only.

Each of the above-described embodiments constitutes a refrigerating cycle apparatus which air-conditions the driver's compartment while the truck is running and which cools the nap space using accumulated cold potential while the truck is parked. Alternatively, a refrigerating cycle apparatus according to the invention may air-condition the truck interior and operate an onboard refrigerator using a cold accumulating material.

The above embodiments each utilize two solenoid valves 21 and 22 for switching on and off the flow of the refrigerant through the air-conditioning refrigerant circuit (first refrigerant circuit) 12 and the cold accumulating refrigerant circuit (second refrigerant circuit) 13. Alternatively, the two valves may be replaced by a three-way valve.

With these and other alternatives, modifications and variations of the invention becoming apparent to those skilled in the art in light of the foregoing description, the scope of the invention should be determined by the appended claims and their legal equivalents, rather than by the examples given.

What is claimed is:

1. A refrigerating cycle apparatus comprising:

a compressor for compressing and discharging a refrigerant;

a condenser for cooling and condensing a gas refrigerant discharged by the compressor;

a first refrigerant circuit including first decompressing means for decompressing a liquid refrigerant condensed by the condenser and a first evaporator for evaporating the refrigerant decompressed by the first decompressing means;

a second refrigerant circuit in parallel with the first refrigerant circuit, the second refrigerant circuit including second decompressing means for decompressing the liquid refrigerant condensed by the condenser and a second evaporator for evaporating the refrigerant decompressed by the second decompressing means in order to cool a cold accumulating material;

an inlet-side conduit for combining downstream sides of the first refrigerant circuit and the second refrigerant circuit to connect the combined part to an inlet port of the compressor;

valve means for switching a refrigerant flow to the first refrigerant circuit and to the second refrigerant circuit; and controller means for controlling the valve means and the compressor;

wherein the controller means is further for activating the compressor while substantially cutting off the flow of the refrigerant to the first and the second refrigerant circuits, causing the activated compressor to suck for a predetermined period of time the refrigerant remaining stagnant inside the second evaporator when a temperature at the second evaporator becomes less than or equal to a predetermined temperature, and thereafter switching the valve means to allow the refrigerant to flow only to the first refrigerant circuit.

2. The apparatus of claim 1, wherein the controller means is further for storing a refrigerant suction program for activating the compressor while substantially cutting off the flow of the refrigerant to the first and the second refrigerant circuits, the refrigerant remaining stagnant inside the second evaporator, the refrigerant suction program thereafter switching the valve means to allow the refrigerant to flow only to the first refrigerant circuit for a second predetermined period of time.

3. The apparatus of claim 1, further comprising:

a receiver which, located downstream of the condenser, separates a liquid phase of the refrigerant from a gaseous phase thereof and receives the separated liquid refrigerant; and a sight glass which, located downstream of the receiver, permits visual inspection of gas/liquid status of the refrigerant and of an amount of the latter.

4. The apparatus of claim 1, wherein:

the first evaporator is arranged to cool the flow of air of an air-conditioner for use on board a vehicle;

the second evaporator and the cold accumulating material are installed inside a cold accumulating air-conditioning unit; and the cold accumulating air-conditioning unit is arranged to blow into a vehicle interior the flow of air cooled by the cold accumulating material.

5. A refrigerating cycle apparatus comprising:

a compressor for compressing and discharging a refrigerant;

a condenser for cooling and condensing a gas refrigerant discharged by the compressor;

a first refrigerant circuit including first decompressing means for decompressing a liquid refrigerant condensed by the condenser and a first evaporator for evaporating the refrigerant decompressed by the first decompressing means;

a second refrigerant circuit in parallel with the first refrigerant circuit, the second refrigerant circuit including second decompressing means for decompressing the liquid refrigerant condensed by the condenser and a second evaporator for evaporating the refrigerant decompressed by the second decompressing means in order to cool a cold accumulating material;

an inlet-side conduit for combining downstream sides of the first refrigerant circuit and the second refrigerant circuit to connect the combined part to an inlet port of the compressor;

valve means for switching a refrigerant flow to the first refrigerant circuit and to the second refrigerant circuit; and controller means for controlling the valve means and the compressor;

wherein the controller means is further for activating the compressor while substantially cutting off the flow of the refrigerant to the first and the second refrigerant circuits, causing the activated compressor to suck for a predetermined period of time the refrigerant remaining stagnant inside the second evaporator, and thereafter switching the valve means to allow the refrigerant to flow only to the first refrigerant circuit;

wherein the controller means is further for storing a refrigerant suction program for activating the compressor while substantially cutting off the flow of the refrigerant to the first and the second refrigerant circuits, the refrigerant suction program causing the activated compressor to suck for a first predetermined period of time the refrigerant remaining stagnant inside the second evaporator, the refrigerant suction program thereafter switching the valve means to allow the refrigerant to flow only to the first refrigerant circuit for a second predetermined period of time;

wherein the controller means includes a switch for executing the refrigerant suction program.

6. A refrigerating cycle apparatus comprising:

a compressor for compressing and discharging a refrigerant;

a condenser for cooling and condensing a gas refrigerant discharged by the compressor;

a first refrigerant circuit including first decompressing means for decompressing a liquid refrigerant condensed by the condenser and a first evaporator for evaporating the refrigerant decompressed by the first decompressing means;

a second refrigerant circuit in parallel with the first refrigerant circuit, the second refrigerant circuit including second decompressing means for decompressing the liquid refrigerant condensed by the condenser and a second evaporator for evaporating the refrigerant decompressed by the second decompressing means in order to cool a cold accumulating material;

an inlet-side conduit for combining downstream sides of the first refrigerant circuit and the second refrigerant circuit to connect the combined part to an inlet port of the compressor;

valve means for switching a refrigerant flow to the first refrigerant circuit and to the second refrigerant circuit;

controller means for controlling the valve means and the compressor;

wherein the controller means is further for activating the compressor while substantially cutting off the flow of the refrigerant to the first and the second refrigerant circuits, causing the activated compressor to suck for a predetermined period of time the refrigerant remaining stagnant inside the second evaporator, and thereafter switching the valve means to allow the refrigerant to flow only to the first refrigerant circuit; and refrigerant pressure detecting means which, interposed between the inlet port of the compressor and the second evaporator, is for detecting a refrigerant pressure inside a refrigerant circuit therebetween;

wherein the predetermined period of time is the time it takes for a pressure value detected by the refrigerant pressure detecting means to drop to not more than a predetermined pressure level.

7. A refrigerating cycle apparatus comprising:

a compressor for compressing and discharging a refrigerant;

a condenser for cooling and condensing a gas refrigerant discharged by the compressor;

a first refrigerant circuit including first decompressing means for decompressing a liquid refrigerant condensed by the condenser and a first evaporator for evaporating the refrigerant decompressed by the first decompressing means;

a second refrigerant circuit in parallel with the first refrigerant circuit, the second refrigerant circuit including second decompressing means for decompressing the liquid refrigerant condensed by the condenser and a second evaporator for evaporating the refrigerant decompressed by the second decompressing means in order to cool a cold accumulating material;

an inlet-side conduit for combining downstream sides of the first refrigerant circuit and the second refrigerant circuit to connect the combined part to an inlet port of the compressor;

valve means for switching a refrigerant flow to the first refrigerant circuit and to the second refrigerant circuit;

controller means for controlling the valve means and the compressor;

wherein the controller means is further for activating the compressor while substantially cutting off the flow of the refrigerant to the first and the second refrigerant circuits, causing the activated compressor to suck for a predetermined period of time the refrigerant remaining stagnant inside the second evaporator, and thereafter switching the valve means to allow the refrigerant to flow only to the first refrigerant circuit;

wherein the controller means is further for storing a refrigerant suction program for activating the compressor while substantially cutting off the flow of the refrigerant to the first and the second refrigerant circuits, the refrigerant suction program causing the activated compressor to suck for a first predetermined period of time the refrigerant remaining stagnant inside the second evaporator, the refrigerant suction program thereafter switching the valve means to allow the refrigerant to flow only to the first refrigerant circuit for a second predetermined period of time;

wherein the controller means includes a switch for executing the refrigerant suction program; and first and second switches for supplying the refrigerant to the first and the second evaporators respectively;

wherein the switch is at least one of the first and the second switches;

wherein operating either the first or the second switch within the first predetermined period of time causes the refrigerating cycle apparatus to stop suction of the refrigerant, either of the first and the second refrigerant circuits being supplied with the refrigerant depending on the first and the second switches being either on or off individually.

8. A refrigerating cycle apparatus comprising:

a compressor for compressing and discharging a refrigerant;

a condenser for cooling and condensing a gas refrigerant discharged by the compressor;

a first refrigerant circuit including first decompressing means for decompressing a liquid refrigerant condensed by the condenser and a first evaporator for evaporating the refrigerant decompressed by the first decompressing means;

a second refrigerant circuit in parallel with the first refrigerant circuit, the second refrigerant circuit including second decompressing means for decompressing the liquid refrigerant condensed by the condenser and a second evaporator for evaporating the refrigerant decompressed by the second decompressing means in order to cool a cold accumulating material;

an inlet-side conduit for combining downstream sides of the first refrigerant circuit and the second refrigerant circuit to connect the combined part to an inlet port of the compressor;

valve means for switching a refrigerant flow to the first refrigerant circuit and to the second refrigerant circuit;

controller means for controlling the valve means and the compressor;

wherein the controller means is further for activating the compressor while substantially cutting off the flow of the refrigerant to the first and the second refrigerant circuits, causing the activated compressor to suck for a predetermined period of time the refrigerant remaining stagnant inside the second evaporator, and thereafter switching the valve means to allow the refrigerant to flow only to the first refrigerant circuit; and temperature detecting means for detecting a temperature representative of a surface temperature of one of the second evaporator and the cold accumulating material;

wherein the compressor is activated if the temperature detected by the temperature detecting means drops not more than a predetermined temperature and if stagnant refrigerant is judged to remain within the second evaporator.

9. A refrigerant amount detecting method comprising inspecting, in a refrigerating cycle including a compressor for compressing and discharging a refrigerant, a condenser for cooling and condensing a gas refrigerant discharged by the compressor, a first refrigerant circuit including a first expansion valve for decompressing a liquid refrigerant condensed by the condenser and a first evaporator for evaporating the refrigerant decompressed by the first expansion valve, a second refrigerant circuit, in parallel with the first refrigerant circuit, which includes a second expansion valve for decompressing the liquid refrigerant condensed by the condenser and a second evaporator for evaporating the refrigerant decompressed by the second expansion valve in order to cool a cold accumulating material, an inlet-side conduit for combining downstream sides of the first refrigerant circuit and the second refrigerant circuit to connect the combined part to an inlet port of the compressor, a valve assembly for switching a refrigerant flow to the first refrigerant circuit and to the second refrigerant circuit; and a controller for controlling the valve assembly and the compressor to activate the compressor while substantially cutting off the flow of the refrigerant to the first and the second refrigerant circuits, causing the activated compressor to suck for a predetermined period of time the refrigerant remaining stagnant inside the second evaporator when a temperature at the second evaporator becomes less than or equal to a predetermined temperature, and thereafter switching the valve assembly to allow the refrigerant to flow only to the first refrigerant circuit, an amount of the refrigerant inside the refrigerating cycle apparatus being detectable based on the refrigerant flowing through the first refrigerant circuit.

10. The method of claim 9, said inspecting being performed by visual inspections of gas/liquid status of the refrigerant and of an amount of the latter through a sight glass located downstream of a receiver which, located downstream of the condenser, separates a liquid phase of the refrigerant from a gaseous phase thereof and receives the separated liquid refrigerant.

11. A method of controlling a refrigerating circuit including a compressor and first and second air conditioning units in parallel fluid communication therewith, comprising the steps of:

determining if a temperature at the first air conditioning unit is less than a first predetermined temperature;

determining if a temperature at the second air conditioning unit is less than a second predetermined temperature if the temperature at the first air conditioning unit is less than the first predetermined temperature;

cutting off a flow of refrigerant to both the first and second air conditioning units when the temperature at the second air conditioning unit is less than the second predetermined temperature; and causing the compressor to suck stagnant refrigerant from the second air conditioning unit when the temperature at the second conditioning unit is less than the second predetermined temperature and until a predetermined circuit condition is reached.

12. The method of claim 11, further comprising the step of causing refrigerant to flow only to the first air conditioning unit after the predetermined circuit condition has been reached for refrigerant supply determination purposes.

13. The method of claim 11, wherein the predetermined circuit condition comprises a predetermined compressor inlet pressure.

14. The method of claim 11, wherein the predetermined circuit condition comprises a predetermined time period.

15. The method of claim 11, further comprising the step of interrupting the steps of cutting off a flow of refrigerant to both the first and second air conditioning units and causing the compressor to suck stagnant refrigerant from the second air conditioner unit if at least one of the first and second air conditioner units is turned on during performance of these steps.

16. A refrigerating cycle apparatus comprising:

a compressor for compressing and discharging a refrigerant;

a condenser for cooling and condensing a gas refrigerant discharged by the compressor;

a first refrigerant circuit including first decompressing means for decompressing a liquid refrigerant condensed by the condenser and a first evaporator for evaporating the refrigerant decompressed by the first decompressing means;

a second refrigerant circuit in parallel with the first refrigerant circuit, the second refrigerant circuit including second decompressing means for decompressing the liquid refrigerant condensed by the condenser and a second evaporator for evaporating the refrigerant decompressed by the second decompressing means in order to cool a cold accumulating material;

an inlet-side circuit for combining downstream sides of the first refrigerant circuit and the second refrigerant circuit to connect the combined part to an inlet port of the compressor;

valve means for switching a refrigerant flow to the first refrigerant circuit and to the second refrigerant circuit;

controller means for controlling the valve means and the compressor;

wherein the controller means is further for activating the compressor while substantially cutting off the flow of the refrigerant to the first and the second refrigerant circuits, causing the activated compressor to suck for a predetermined period of time the refrigerant remaining stagnant inside the second evaporator, and thereafter switching the valve means to allow the refrigerant to flow only to the first refrigerant circuit;

wherein the controller mean is further for storing a refrigerant suction program for activating the compressor while substantially cutting off the flow of the refrigerant to the first and the second refrigerant circuits, the refrigerant suction program causing the activated compressor to suck for a first predetermined period of time the refrigerant remaining stagnant inside the second evaporator, the refrigerant suction program thereafter switching the valve means to allow the refrigerant to flow only to the first refrigerant circuit for a second predetermined period of time;

wherein the controller means includes a switch for executing the refrigerant suction program; and first and second switches for supplying the refrigerant to the first and the second evaporators respectively;

wherein the switch is at least one of the first and the second switches.

* * * * *

UNITED STATES PATENT AND TRADEMARK OFFICE
CERTIFICATE OF CORRECTION

PATENT NO. : 5,910,159

DATED : June 8, 1999

INVENTOR(S) : Hiroki Matsuo et al

It is certified that error appears in the above-identified patent and that said Letters Patent is hereby corrected as shown below:

Col. 6, line 45, delete "a"

Col. 9, line 35, delete "cold accumulating" and insert --first embodiment).--

Col. 10, line 8, "drop" should be --drops--

Col. 10, line 44, "("No")" should be --("NO")--

Col. 12, line 56, "730" should be --S730--

Col. 13, line 20, after "operator." insert a paragraph break

Col. 14, line 54, claim 2, after "circuit," insert -- the refrigerant suction program causing the activated compressor to suck for a first predetermined period of time --

Col. 18, line 58, claim 11, after 1st occurrence of "second" insert --air--

Col. 20, line 13, claim 16, "mean" should be --means--

Signed and Sealed this

Eighth Day of February, 2000

Attest:

Q. TODD DICKINSON

*Attesting Officer*   Commissioner of Patents and Trademarks